March 3, 1970     D. B. CARSON     3,498,756

MULTIPLE STAGE REACTOR SUITABLE FOR HIGH PRESSURES

Filed May 26, 1966

INVENTOR:
Don B. Carson

BY: *James R. Hootson Jr.*
*Philip T. Liggett*
ATTORNEYS

United States Patent Office 3,498,756
Patented Mar. 3, 1970

3,498,756
MULTIPLE STAGE REACTOR SUITABLE FOR
HIGH PRESSURES
Don B. Carson, Mount Prospect, Ill., assignor to Universal
Oil Products Company, Des Plaines, Ill., a corporation
of Delaware
Filed May 26, 1966, Ser. No. 553,172
Int. Cl. B01j 3/00, 9/04
U.S. Cl. 23—289                                    1 Claim

ABSTRACT OF THE DISCLOSURE

A multiple stage reactor formed by a number of spherical chambers in series alignment connected at junctures between adjacent spheres, each such juncture providing a restricted cross-sectional area passageway between adjacent chambers. A heat control fluid is injected at each juncture whereby it is admixed with a collected reactant stream from one chamber and introduced to the next.

---

Figure 1:
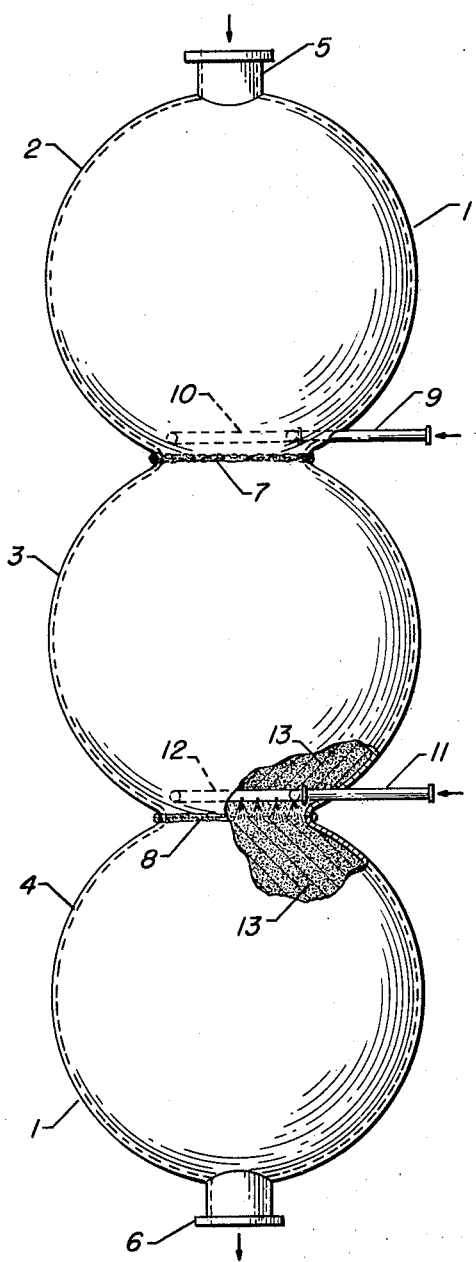

The present invention relates to a multiple stage reactor unit particularly suitable for high pressure operations. More specifically, the present improved reactor design embodies the use of spherical sections, which better withstand high pressure conditions with minimum wall thickness, while at the same time providing a design particularly adapted to effect the intermediate introduction of one or more fluid streams such as additional reactant, a quench stream or a heating medium.

With regard to certain hydrocarbon conversions, as for example with a hydrogenation process or with a multiple stage hydrocracking operation, there is the high pressure and high temperature contact of a hydrocarbon stream in the presence of a subdivided catalyst material and added hydrogen so as to effect yields of gasoline or more valuable hydrocarbons from less desirable feed stocks. Hydrocracking and hydrogenation operations are optimally carried out with intermediate additions of hydrogen or with a quench stream to effect control of temperature. On the other hand, in connection with an endothermic conversion such as a dehydrogenation process, it is desirable to effect an intermediate heating operation between various stages of contact. In such instances, a heated reactant stream, super-heated steam, or other compatible heating medium may be introduced between catalyst contacting stages.

It may be considered one object of the present invention to provide for the pressure tight joining of a series of aligned spherical chamber sections, which are in communication with one another such that there is a resulting unitary reactor adapted for a multiple zone catalytic contact unit as well as the formation of restricted area converging-diverging passageway sections between contact zones.

It is also an object of the present invention to provide for the introduction of a heat exchange medium, or an added reactant stream, at the juncture planes or restricted passageway zones between the different sections of the unitary chamber to in turn insure obtaining optimum mixing with a partially contacted reactant stream before it is admitted to a next adjacent downstream section.

Broadly, the invention may be considered to provide a unitary multiple section reactor chamber suitable for effecting superatmospheric conversions in the presence of a contact material and adapted to have intermediate introductions of one or more fluid streams, which comprises in combination, a plurality of substantially separate spherically shaped chamber portions which are positioned in a series alignment and have rigid pressure tight connecting means at junctures between adjacent portions, with such junctures providing a restricted area passageway section communicating between each of the adjacent spherical chamber portions of the plurality thereof, subdivided contact material maintained in each of said plurality of chamber portions, fluid inlet means to at least one end chamber portion and fluid outlet means from at least the opposing end chamber portion of the plurality thereof, and at least one fluid inlet means connecting with at least one juncture of the chamber portions for introducing a fluid stream into the adjacent restricted area passageway section being provided at such juncture, whereby an injected fluid may be admixed with a collected reactant stream from one chamber portion and introduced therewith into the next adjacent chamber portion and through the contact material therein.

It is not intended to limit the improved reactor design to any one process, or for use with any one type of catalytic material; however, in view of the design aspects utilizing spherical segments there is a special advantage for using the reactor with high pressure operations. From structural design considerations, the utilization of spherical chamber sections permits optimum use of metal such that wall thicknesses can be one-half of what they would be for a cylindrical vessel construction of the same diameter designed to accommodate the same processing pressure condition.

Reference to the accompanying drawing will serve to diagrammatically illustrate the improved construction, while the description in connection therewith will also serve to point out additional advantageous features which are obtained by the present design and arrangement.

FIGURE 1 of the drawing is a diagrammatic elevational view of a reactor chamber formed of spherical sections and adapted to have internal contact material and, in addition, provide for the intermediate introduction of one or more fluid mediums at junctures between spherical portions of the unitary chamber.

Figure 2:
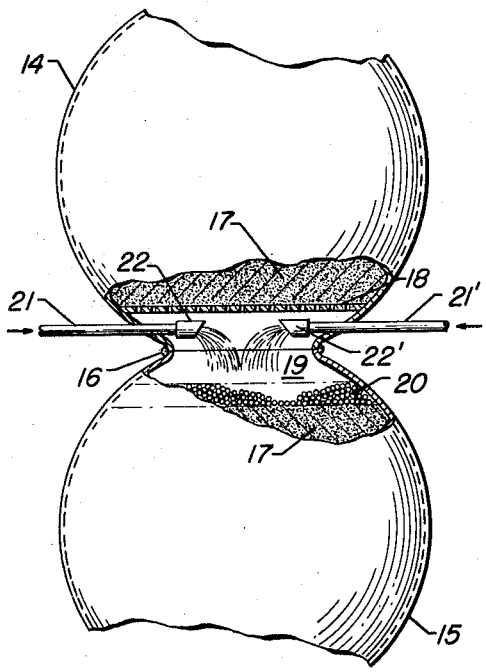

FIGURE 2 of the drawing indicates, in a paritial sectional view, a modified arrangement for introducing one or more fluid mediums between spherical sections of the unit such that there is mixing with the reactant stream flow at a zone of flow constriction.

Referring now particularly to FIGURE 1 of the drawing, there is indicated a vertically positioned multiple stage reactor unit 1 with an upper spherical section 2, an intermediate spherical section 3, and a lower spherical section 4. The upper section 2 is indicated as having a fluid inlet 5 while the lower section 4 is indicated as having a lower product outlet 6. In accordance with the present invention, the plurality of spherical chamber sections are caused to be joined in an aligned series such that there is open communication through restricted area passageway zones between adjacent spherical portions. In other words, adjacent spherical chamber portions are welded or otherwise fixed to each other at a common juncture plane, such as at 7 between sections 2 and 3, and at the juncture plane 8 between sections 3 and 4.

An intermediate fluid inlet line 9 is indicated as connecting with a distributing ring or header means 10 at the zone of juncture 7 while a lower intermediate inlet line 11 is shown connecting with internal fluid distributing header means 12 at the zone of juncture 8. In this way a quench stream, a heating medium, or additional reactant may be introduced into a downflowing principal reactant stream entering at inlet 5 and being discharged by way of outlet 6.

The entire multiple stage unitary chamber may be filled with a suitable catalytic material 13 carrying through in a continuous manner as indicated by the partial sectional view shown between chamber portions 3 and 4 or, alternatively, catalysts or other contact material may be discontinuous at passageway zones and independently held within each of the plurality of aligned sections.

Where the unitary spherical section reactor is utilized in connection with multiple stage hydrocracking, the intermediate fluid inlet lines such as 9 and 11 may for example be utilized to introduce added hydrogen at a temperature substantially less than that prevailing within the major portions of the reaction chamber or at outlet areas from each of the chamber sections such that there are resulting intermediate quenches obtained between stages of contact and a control of the overall temperature in the unit.

The present reactor design may also be used to advantage in connection with dehyrogenation operations such as, for example effecting the dehydrogenation of ethyl benzene to styrene, where it is desired to effect stage wise intermediate heating in order to obtain an optimum conversion. Generally, in carrying out the dehydrogenation of ethylbenzene there will be the addition of superheated steam at a temperature in the 1400° to 1450° F. range at each of the passageway zones between adjacent sections whereby there is maintained an internal reactor temperature of the order of 1100° F. or more within each of the catalyst beds. Such a dehydrogenation operation may not necessarily be at a high pressure, but it is pointed out that the improved present design may be used to advantage in optimally carrying out a low pressure conversion where there is needed intermediate heating and optimal mixing with the reactant stream flow.

Referring now to FIGURE 2 of the drawing there is indicated a spherical segment 14 welded or otherwise rigidly connected with an adjacent section 15 at a juncture 16. In this instance the catalyst or other contact material 17 is shown as being supported within each section by a suitable perforate plate or grid means 18 such that there is a substantially open restricted cross-sectional area passageway zone 19 between each of the adjacent reactor sections. There is also indicated the utilization of a thin layer of spherical ceramic balls 20 on top of each catalyst bed 17 such that there is a uniform redistribution of the mixture of reactant stream and additive stream that is being introduced to the next adjacent downstream contact bed. A heating medium, quench, or reactant fluid is indicated as being introduced through the opposing inlet lines 21 and 21' having fluid distributor heads 22 and 22'. By this arrangement, there is optimum mixing of the intermediate additive fluid streams with a principal reactant stream which collects at the lower end of one spherical segment for redistribution into the top of the contact bed of the next adjacent spherical section. Actually, in this type of reactor arrangement, the fluid material goes through an ever changing space velocity by reason of the stream necessarily widening out to pass downwardly to and through the central or maximum cross-sectional area of each section and then passing through a decreasing width portion of the bed within the lower half of each spherical section of the unit to eventually reach each intermediate passageway zone between adjacent spherical segments. Although not shown in the drawing, suitable baffle means or additional flow distribution layers of ceramic balls and the like may be utilized at spaced vertical distances throughout any one unitary apparatus to preclude channeling of the reactant stream down through an axial portion thereof.

Various modifications may be made in the overall design and construction in the manner of effecting intermediate introduction of heating or quenching metals as well as variations in actual structural arrangements for welding or otherwise joining one spherical portion of the chamber to another. Generally, it is believed that the spherical segments may be joined by suitable welding means at any common juncture plane that is normal to the axis or alignment of the plurality of sections. However, where desired, short collars or cylindrical sections may be placed between spherical portions of the chamber such that there is a slightly elongated restricted area passageway between sections. In such instance, the cylindrical wall portions may have a thickness somewhat different than the spherical wall portions to accommodate the pressure and load conditions; however, by reason of the smaller diameters they may be actually thinner than the cylindrical segments and there is no likelihood of added expense to the overall unit. Also, as indicated by virtue of the differences between FIGURES 1 and 2 of the drawing, there may be various arrangements for maintaining a catalyst or contact material within the entire unitary chamber, i.e. with continuity maintained from top to bottom of the entire unit or an arrangement where there is a separate support of a catalyst bed within each of the contact sections. Still further various means, not shown within the present drawing, may be utilized to effect the discharge of catalyst when it is desired to carry out removal or replacement. It may also be pointed out that the present improved design and construction may make use of internal alloy liner means in each of the spherical portions of the unit such that there is a lessening of the problems from hydrogen penetration, hydrogen embrittlement, and metal corrosion by compounds of sulfur.

I claim as my invention:

1. A unitary multiple-section reactor chamber for effecting superatmospheric conversion in the presence of a contact material and adapted to have intermediate introductions of a fluid stream, which comprises in combination, a plurality of substantially spherically shaped chamber portions which are positioned in a series alignment and are connected at common juncture planes which are normal to their axis of alignment, with such junctures providing a restricted cross-sectional area open passageway section between each of the adjacent spherical chamber portions of the plurality thereof, subdivided contact material maintained in each of said plurality of chamber portions, fluid inlet means to at least one end chamber portion and fluid outlet means from at least the opposing end chamber portion of the plurality thereof to provide a continuous fluid flow through said unitary chamber, and at least one additional fluid inlet means connecting with at least one juncture of the chamber portions that discharges in the direction of the fluid flow through the entire chamber for introducing such additional fluid stream in an educting manner into the adjacent restricted area passageway section being provided at such juncture, whereby an injected fluid may be admixed with a collected reactant stream from one chamber portion and assist in the introduction thereof into a next adjacent chamber portion.

References Cited

UNITED STATES PATENTS

| 2,535,944 | 12/1950 | Mathy | 23—288 |
| 2,892,262 | 6/1959 | Shirk | 23—288 X |
| 2,996,361 | 8/1961 | Brumbaugh | 23—289 X |
| 3,007,779 | 11/1961 | Vlachos | 23—289 X |
| 3,208,833 | 9/1965 | Carson | 23—288 |
| 3,214,247 | 10/1965 | Broughton | 23—288 |
| 2,148,234 | 2/1939 | Debor | 220—3 |
| 3,409,408 | 11/1968 | Ballestra | 23—284 X |

JOSEPH SCOVRONEK, Primary Examiner

U.S. Cl. X.R.

23—284; 220—3; 260—669